(12) United States Patent
Choi et al.

(10) Patent No.: US 11,367,374 B2
(45) Date of Patent: Jun. 21, 2022

(54) DISPLAY DEVICE AND MICROCONTROLLER INCLUDED THEREIN

(71) Applicant: SILICON WORKS CO., LTD., Daejeon (KR)

(72) Inventors: Yong Woo Choi, Daejeon (KR); Sung Chun Kim, Daejeon (KR); Byoung Sun Ahn, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 17/197,666

(22) Filed: Mar. 10, 2021

(65) Prior Publication Data

US 2021/0287584 A1 Sep. 16, 2021

(30) Foreign Application Priority Data

Mar. 12, 2020 (KR) .......................... 10-2020-0030810

(51) Int. Cl.
*G09G 3/20* (2006.01)
*G06F 3/041* (2006.01)
*G06F 13/42* (2006.01)
*G09G 5/00* (2006.01)
*G06F 3/044* (2006.01)

(52) U.S. Cl.
CPC ............. *G09G 3/20* (2013.01); *G06F 3/0416* (2013.01); *G09G 2310/08* (2013.01); *G09G 2330/023* (2013.01); *G09G 2354/00* (2013.01); *G09G 2370/08* (2013.01)

(58) Field of Classification Search
USPC ........................................................... 345/55
See application file for complete search history.

(56) References Cited

U.S. PATENT DOCUMENTS

| | | | |
|---|---|---|---|
| 10,944,406 B1* | 3/2021 | Du | H04L 7/033 |
| 2001/0033188 A1* | 10/2001 | Aung | H03L 7/187 326/41 |
| 2011/0037758 A1* | 2/2011 | Lim | H03L 7/0805 345/213 |
| 2014/0334584 A1* | 11/2014 | Lakkis | H03L 7/0996 375/376 |
| 2016/0149694 A1* | 5/2016 | Choi | A61B 5/112 375/355 |
| 2017/0162245 A1* | 6/2017 | Song | G11C 7/1066 |
| 2019/0196532 A1* | 6/2019 | Jang | G06F 13/4291 |
| 2020/0365199 A1* | 11/2020 | Seong | H03L 7/0814 |
| 2021/0111859 A1* | 4/2021 | Gaade | H03L 7/0998 |
| 2021/0314135 A1* | 10/2021 | Hung | H03L 7/0891 |

FOREIGN PATENT DOCUMENTS

| KR | 10-1590342 B1 | 2/2016 |
|---|---|---|
| KR | 10-2016-0118902 A | 10/2016 |
| KR | 10-2018-0042509 A | 4/2018 |
| KR | 10-2019-0136257 A | 12/2019 |

* cited by examiner

*Primary Examiner* — Chineyere D Wills-Burns
(74) *Attorney, Agent, or Firm* — Fenwick & West LLP

(57) ABSTRACT

Disclosed is data communication between a microcontroller and a source readout circuit, in which the clock circuit of a slave is not needed, and the size of a slave circuit and the amount of power consumed may be reduced.

15 Claims, 10 Drawing Sheets

DISPLAY DEVICE AND MICROCONTROLLER INCLUDED THEREIN

CROSS REFERENCE TO RELATED APPLICATION

This application claims priority from Republic of Korea Patent Application No. 10-2020-0030810, filed on Mar. 12, 2020, which is hereby incorporated by reference in its entirety.

BACKGROUND

1. Field of Technology

The present disclosure relates to a technology associated with touch sensing data communication between a microcontroller and a source readout circuit.

2. Description of the Prior Art

A large amount of data may be transmitted or received between internal circuits in a display device. The data may include image data which includes information associated with an image to be displayed in a panel, control data which controls an internal circuit for displaying the image, and touch sensing data which is information associated with whether an external object touches or approaches the panel. Therefore, there is a desire for regulations for transmitting or receiving data. For example, the regulations may include information indicating whether a communication scheme corresponds to a synchronization scheme or asynchronization scheme, and information associated with an order of data transmission or reception if the communication scheme corresponds to the synchronization scheme.

Generally, data communication between internal circuits of a display device may be based on a serial peripheral interface (SPI) or an inter-integrated circuit (I2C). According to the SPI or I2C scheme, if a delay corresponding to at least one period of a clock occurs in the communication between a master and a slave, the master may not read received data. Here, the slave may include a source readout circuit (readout IC (ROIC)) that transmits touch sensing data, and the master may include a microcontroller (MCU) that receives touch sensing data. Due to the concern about a delay, it is difficult to increase a communication speed in the SPI or I2C scheme. To solve the drawback, the slave may transmit data to the master together with a clock.

To transmit a clock, the slave needs to include a circuit to generate a clock. If the slave includes a clock circuit, the size of the slave circuit becomes large. In the SPI or I2C scheme, a single master communicates with a plurality of slaves. If each of the plurality of slaves includes a clock circuit, the size of a display device may become large from the perspective of the entire system.

In addition, a clock circuit also consumes power. Accordingly, the amount of power consumed may be increased as much as the number of clock circuits included.

SUMMARY

Accordingly, the embodiments of the present disclosure provide an improved data communication method of a display device, which reduces the size of a circuit and decreases the amount of power consumed.

An aspect of the present disclosure is to provide a technology that enables a master to accurately recover data even though a slave transmits the data without a clock.

Another aspect of the present disclosure is to provide a technology that enables a master to accurately recover data by sampling the data using a clock having a high frequency.

Another aspect of the present disclosure is to provide a technology that adds pattern data that is agreed on in advance to data transmitted by a slave, and recognizes the start timing of data to be sampled.

In accordance with an aspect of the present disclosure, there is provided a microcontroller included in a display device, the microcontroller including: a transmitting circuit configured to transmit first data and a first clock synchronized with the first data; a receiving circuit configured to receive second data generated according to a clock having a frequency identical to that of the first clock; a clock generating circuit configured to generate a second clock having a frequency higher than that of the first clock; and a data recovery circuit configured to determine a plurality of sampling points in the second clock, to perform sampling of the second data at one of the plurality of sampling points, and to recover the second data.

In the microcontroller, the second data may include data sampled according to the second clock and pattern data which indicates the start of the data, and the data recovery circuit identifies the pattern data, recognizes the data, and performs sampling of the data.

In the microcontroller, the clock generating circuit may generate the second clock to have a frequency which is N times (N is a natural number greater than or equal to 3) greater than that of the first clock.

In the microcontroller, the pattern data may be received via the receiving circuit after a read command associated with the second data is provided.

In the microcontroller, the pattern data may comprise a signal having a combination of a first level and a second level which is different from the first level.

In the microcontroller, the transmitting circuit may transmit the first clock during a section in which the first data is transmitted and a section in which the second data is received.

In the microcontroller, the plurality of sampling points may correspond to a rising edge or a falling edge of the second clock.

In the microcontroller, the second data may include touch sensing data associated with an external object's touch or approach to the display device.

In the microcontroller, the second data may be received from a readout circuit included in the display device.

In the microcontroller, the second clock may have a setup section and a hold section before and after the plurality of sampling points, and the data recovery circuit may generate valid sampled data if the setup section and the hold section fall within a section corresponding to one symbol of the second data.

In accordance with an aspect of the present disclosure, there is provided a display device, the device including: a microcontroller configured to transmit first data and a first clock synchronized with the first data; and a readout circuit configured to generate second data according to a clock having a frequency which is identical to that of the first clock, and to transmit the second data to the microcontroller, and the microcontroller is configured to generate a second clock having a frequency higher than that of the first clock, to determine a plurality of sampling points in the second clock, to perform sampling of the second data at one of the plurality of sampling points, and to recover the second data.

In the device, the microcontroller may generate the second clock to have at least N sampling points (N is a natural number greater than or equal to 3).

In the device, a time-delay may occur in signal lines between the microcontroller and the readout circuit.

In the device, the readout circuit may generate the second data by synchronizing with the first clock.

In the device, the second data may include touch sensing data associated with an external object's touch or approach to the display device, and the microcontroller may perform sampling of the touch sensing data at the one sampling point.

According to the present disclosure as described above, a clock is not used for data transmission from a slave to a master and thus, the size of a slave circuit may be reduced, and the amount of power consumed may be decreased.

DETAILED DESCRIPTION

Figure 1:
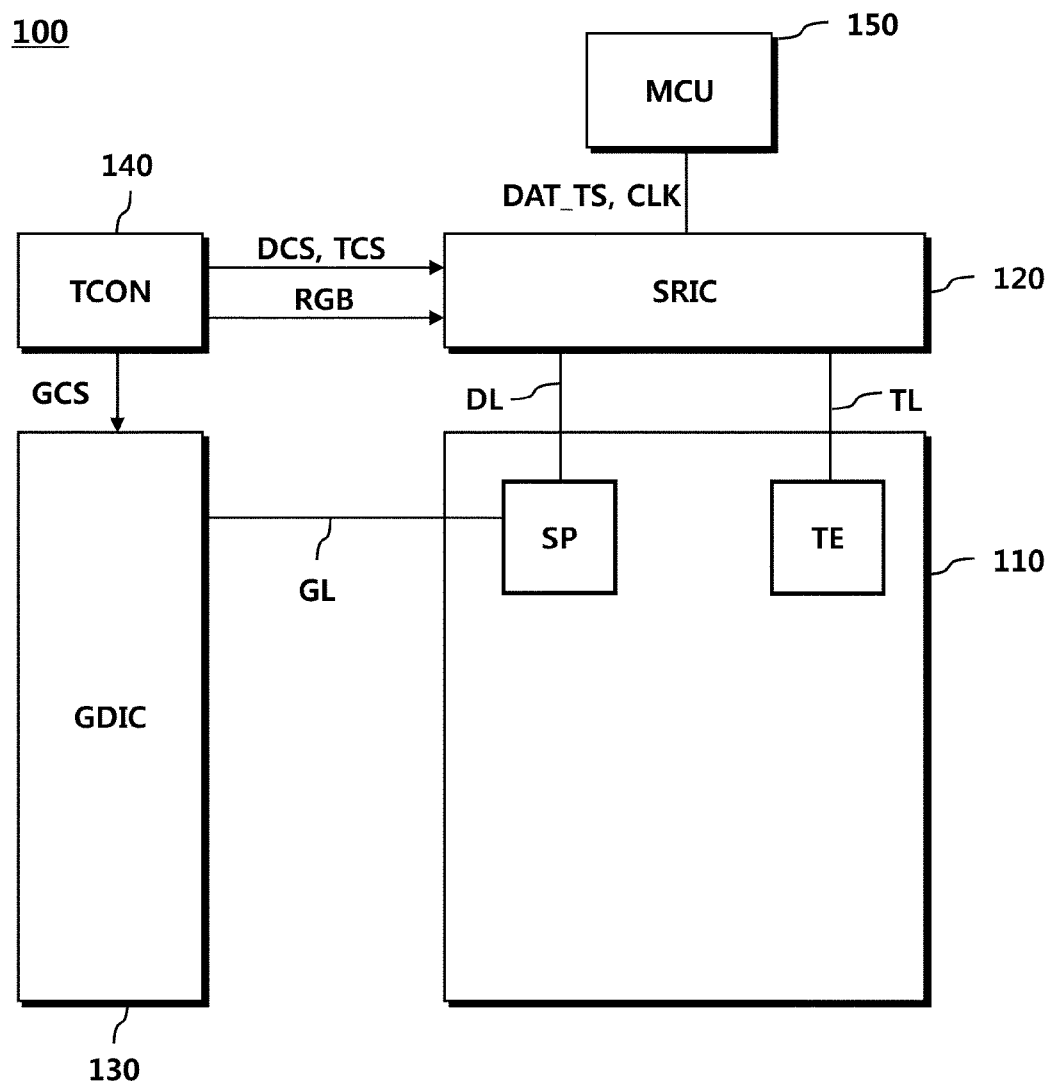
FIG. 1 is a diagram illustrating the configuration of a display device according to an embodiment.

FIG. 1 is a diagram illustrating the configuration of a display device 100 according to an embodiment.

Referring to FIG. 1, a display device 100 may include a panel 110, a source readout circuit (source readout IC (SRIC)) 120, a gate driving circuit (gate driving IC (GDIC)) 130, a timing controller (TCON) 140, and a microcontroller (MCU) 150.

In the panel 110, a plurality of data lines (DL) and a plurality of gate lines (GL) may be disposed, and a plurality of pixels may be disposed. A pixel may include a plurality of sub-pixels (SP). Here, a sub-pixel may be red (R), green (G), blue (B), white (W), and the like. A single pixel may include RGB sub-pixels (SP), RGBG sub-pixels (SP), RGBW sub-pixels (SP), or the like. Hereinafter, for ease of description, it is illustrated that a single pixel includes RGB sub-pixels (SP).

The source readout circuit 120, the gate driving circuit 130, and the timing controller 140 may be devices for generating signals in order to display an image in the panel 110.

The gate driving device 130 may supply a gate driving signal of a turn-on voltage or a turn-off voltage to a gate line (GL). If a gate driving signal of a turn-on voltage is supplied to a sub-pixel (SP), the sub-pixel (SP) is connected to a data line (DL). If a gate driving signal of a turn-off voltage is supplied to a sub-pixel (SP), the connection between the sub-pixel (SP) and the data line (DL) is disconnected.

The source readout circuit 120 may include a source driver (source driver IC (SDIC)) therein. The source driver may supply a data voltage to a sub pixel (SP) via a data line (DL). The data voltage (Vdata) supplied to the data line (DL) may be supplied to a sub-pixel (SP) according to a gate driving signal.

In addition, the source readout circuit 120 may include a readout circuit (readout IC (ROIC)) therein. The readout circuit may be included in the source readout circuit 120, together with the source driver. The readout circuit may drive a touch electrode (TE) adjacent to a sub-pixel (SP) and may sense a touch input. The source readout circuit 120 may drive a touch electrode (TE) via a touch line (TL), and may receive an analog signal coming from the touch electrode (TE).

The source readout circuit 120 may be connected to a bonding pad of the panel 110 in a manner of a tape automated bonding (TAB) type or a chip-on-glass (COG) type, may be directly disposed on the panel 110, or may be integrated with the panel 110 depending on an embodiment. In addition, the source readout circuit 120 may be implemented in a manner of a chip-on-film (COF) type.

The timing controller 140 may supply a control signal to the gate driving circuit 130 and the source readout circuit 120. For example, the timing controller 140 may transmit a gate control signal (GCS), which enables scanning, to the gate driving circuit 130. The timing controller 140 may output image data (RGB) to the source readout circuit 120. In addition, the timing controller 140 may transmit a data control signal (DCS) which controls the source readout circuit 120 to supply a data voltage to each sub-pixel (SP). In addition, the timing controller 140 may transmit a touch control signal (TCS) which controls the source readout circuit 120 to drive each touch electrode (TE) so as to sense a touch input.

The microcontroller 150 may perform data transmission or reception with the readout circuit of the source readout circuit 120. The data may include touch sensing data (DAT_TS), and the DAT_TS may include information associated with whether an external object touches or approaches a touch electrode (TE). The touch or approach may be determined by a change in capacitance of the touch electrode.

The microcontroller 150 may also transmit or receive a clock (CLK) in order to perform data transmission or reception with the readout circuit. According to an embodiment, the readout circuit, which is a slave, may not transmit a clock (CLK), and only the microcontroller 150, which is a master, may use a clock (CLK) in order to transmit data.

Figure 2:
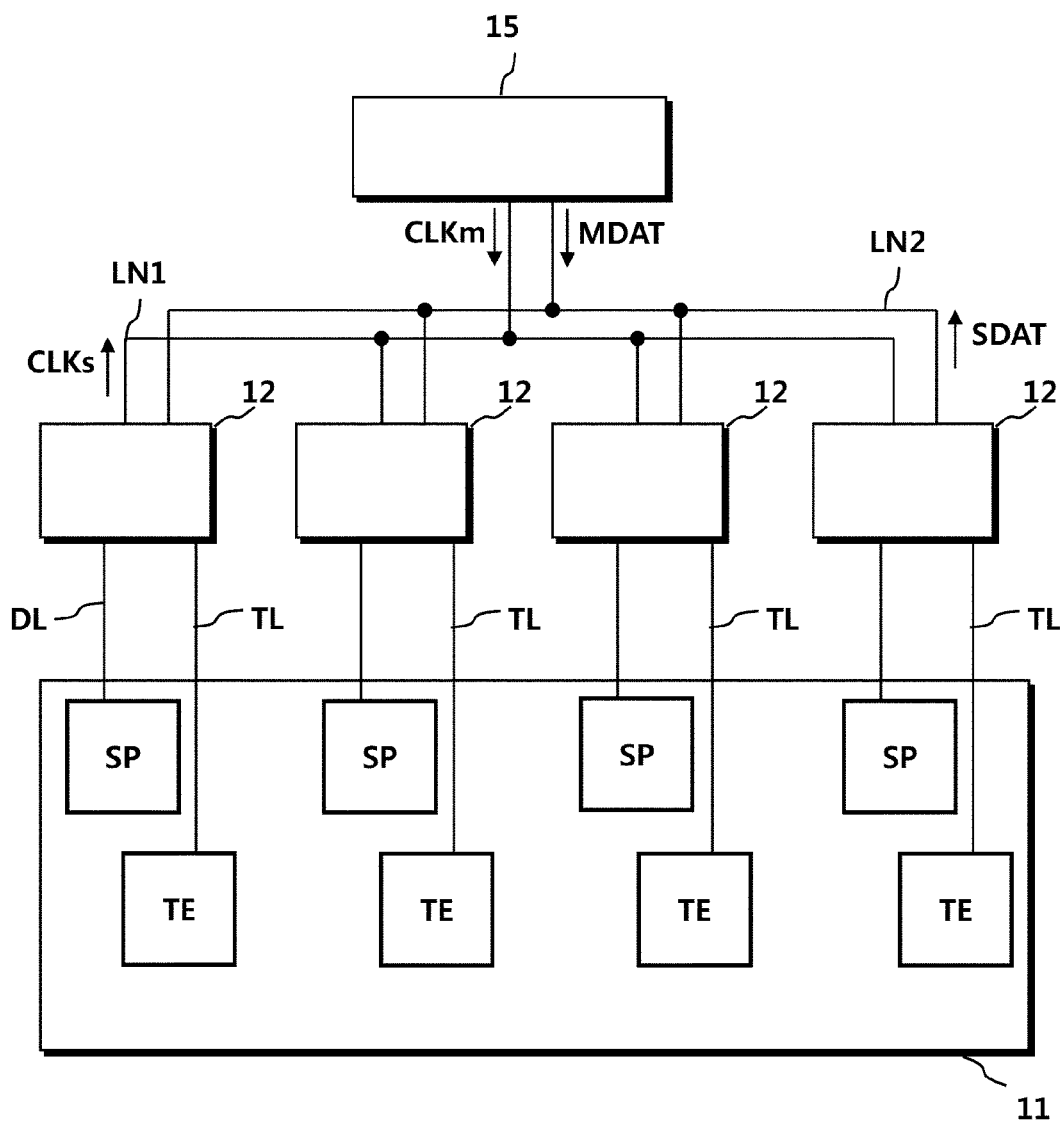
FIG. 2 is a diagram illustrating a connection among a microcontroller, a source readout circuit, and a panel according to the conventional art.

FIG. 2 is a diagram illustrating a connection among a microcontroller, a source readout circuit, and a panel according to the conventional art.

Referring to FIG. 2, conventionally, the microcontroller 15 in display device 10 is connected to a plurality of source readout circuits 12 and may receive and transmit data.

The microcontroller 15 and the plurality of source readout circuits 12 may perform communication according to a serial peripheral interface (SPI) scheme or an inter-integrated circuit (I2C) scheme. The subjects of the communication in the SPI or I2C may operate as a master and a slave. The microcontroller 15 may operate as a master and the plurality of source readout circuits 12 may operate as slaves, respectively.

A first communication line (LN1) and a second communication line (LN2) may be differential signal lines including two signal lines or may be a single signal line operating as an open-drain.

The microcontroller 15 may transmit a master clock (CLKm) to the plurality of source readout circuits 12 via the first communication line (LN1). The master clock (CLKm) may be understood as a clock generated in the microcontroller 15. The master clock (CLKm) may be synchronized with master data (MDAT), and the master data (MDAT) may be transmitted according to the master clock (CLKm). The plurality of source readout circuits 12 may transmit slave clocks (CLKs) to the microcontroller 15 via the first communication line (LN1). The slave clock (CLKs) may be understood as a clock generated in the source readout circuit 12. The slave clock (CLKs) may be synchronized with slave data (SDAT), and the SDAT may be transmitted according to the slave clock (CLKs).

The microcontroller 15 may transmit master data (MDAT) to the plurality of source readout circuits 12 via the second communication line (LN2). The master data (MDAT) may be data that the microcontroller 15, which is a master, transmits to the source readout circuit 12. In addition, the plurality of source readout circuits 12 may transmit slave data (SDAT) to the microcontroller 15 via the second communication line (LN2). Here, the slave data (SDAT) may be synchronized with the slave clock (CLKs) of the first communication line (LN1). The slave data (SDAT) may be data that the plurality of source readout circuits 12, which are slaves, transmit to the microcontroller 15.

As described above, a scheme that synchronizes a clock, for example, a master clock (CLKm) and a slave clock (CLKs), with data, for example, master data (MDAT) and slave data (SDAT), in bi-directional communication, may need a circuit that generates a clock in a slave. If multiple slaves are present and each of the slaves has a clock circuit, the size of the entire circuit may become large due to the clock circuits.

The plurality of source readout circuits 12 may be connected to the panel 11. Each source readout circuit 12 may be assigned with a regularly divided area of the panel 11, may be connected to sub-pixels (SP) existing in the allocated area via a data line (DL), and may be connected to a touch electrode (TE) via a touch line (TL).

Figure 3:
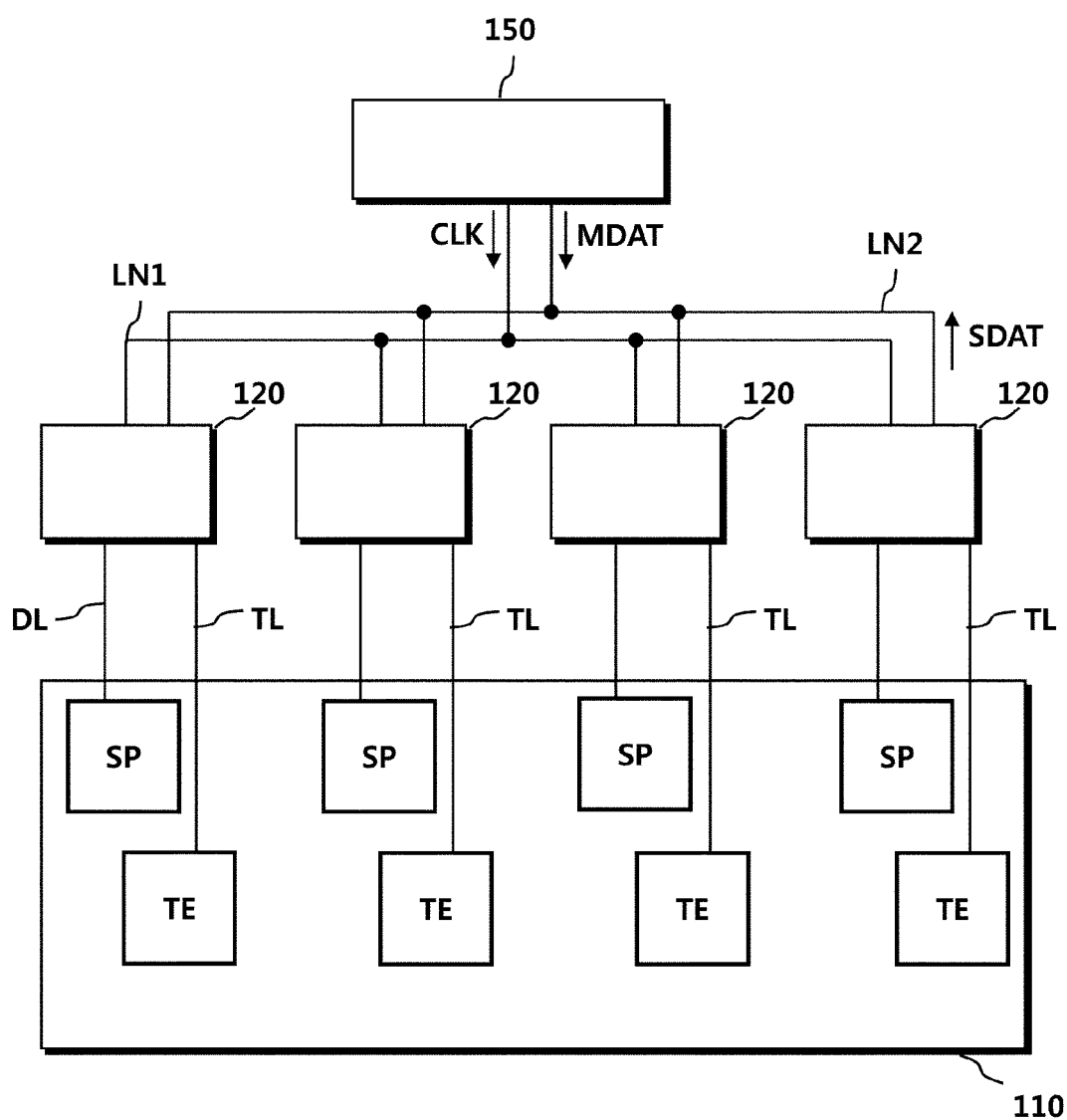
FIG. 3 is a diagram illustrating a connection among a microcontroller, a source readout circuit, and a panel according to an embodiment.

FIG. 3 is a diagram illustrating a connection among a microcontroller 150, a source readout circuit 120, and a panel 110 according to an embodiment.

Referring to FIG. 3, the display device 100 according to an embodiment may not include a clock that the plurality of source readout circuits 120, which are slaves, transmit to the microcontroller 150. A slave may not separately generate a clock to be transmitted to a master.

The microcontroller 150 may transmit a clock (CLK) to the plurality of source readout circuits 120 via a first communication line (LN1). The clock (CLK) may be generated in the microcontroller 150. The clock (CLK) may be synchronized with master data (MDAT), and the master data (MDAT) may be transmitted according to the clock (CLK). However, the source readout circuit 120 may not transmit any clock to the microcontroller 150 via the first communication line (LN1).

The microcontroller 150 may transmit master data (MDAT) to the plurality of source readout circuits 120 via a second communication line (LN2). The plurality of source readout circuits 120 may transmit slave data (SDAT) to the microcontroller 150 via the second communication line (LN2). Here, the slave data (SDAT) may be transmitted solely without a clock.

As described above, if a clock is not used in communication from a slave to the master in bidirectional communication, the slave may not need a circuit that generates a clock. Accordingly, the size of a slave circuit may be decreased by the size of a clock circuit when the clock circuit is not used.

Figure 4:
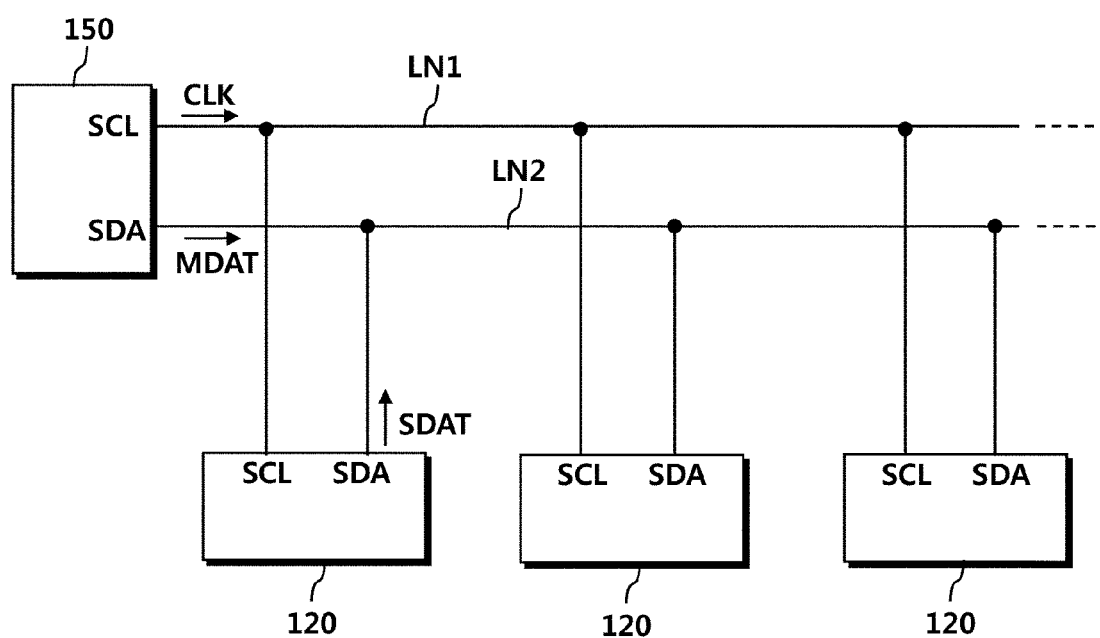
FIG. 4 is a diagram illustrating a first example of communication between a microcontroller and a source readout circuit according to an embodiment.

FIG. 4 is a diagram illustrating a first example of communication between a microcontroller 150 and a source readout circuit 120 according to an embodiment.

Referring to FIG. 4, the microcontroller 150 and the source readout circuit 120 may perform communication according to an I2C scheme. In the I2C communication, the microcontroller 150 may operate as a master and the plurality of source readout circuits 120 may operate as slaves. In FIG. 4, communication between the microcontroller 150 and the source readout circuit 120 may be performed according to an I2C scheme.

A first communication line (LN1) and a second communication line (LN2) may connect the microcontroller 150 and the plurality of source readout circuits 120. The first communication line (LN1) and the second communication line (LN2) may be configured as a common bus.

The microcontroller 150 may transmit a clock (CLK) to the source readout circuit 120 via an SCL terminal. The microcontroller 150 may transmit master data (MDAT) to the source readout circuit 120 via an SDA terminal. Conversely, the source readout circuit 120 may transmit slave data (SDAT) to the microcontroller 150 via the SDA terminal.

Figure 5:
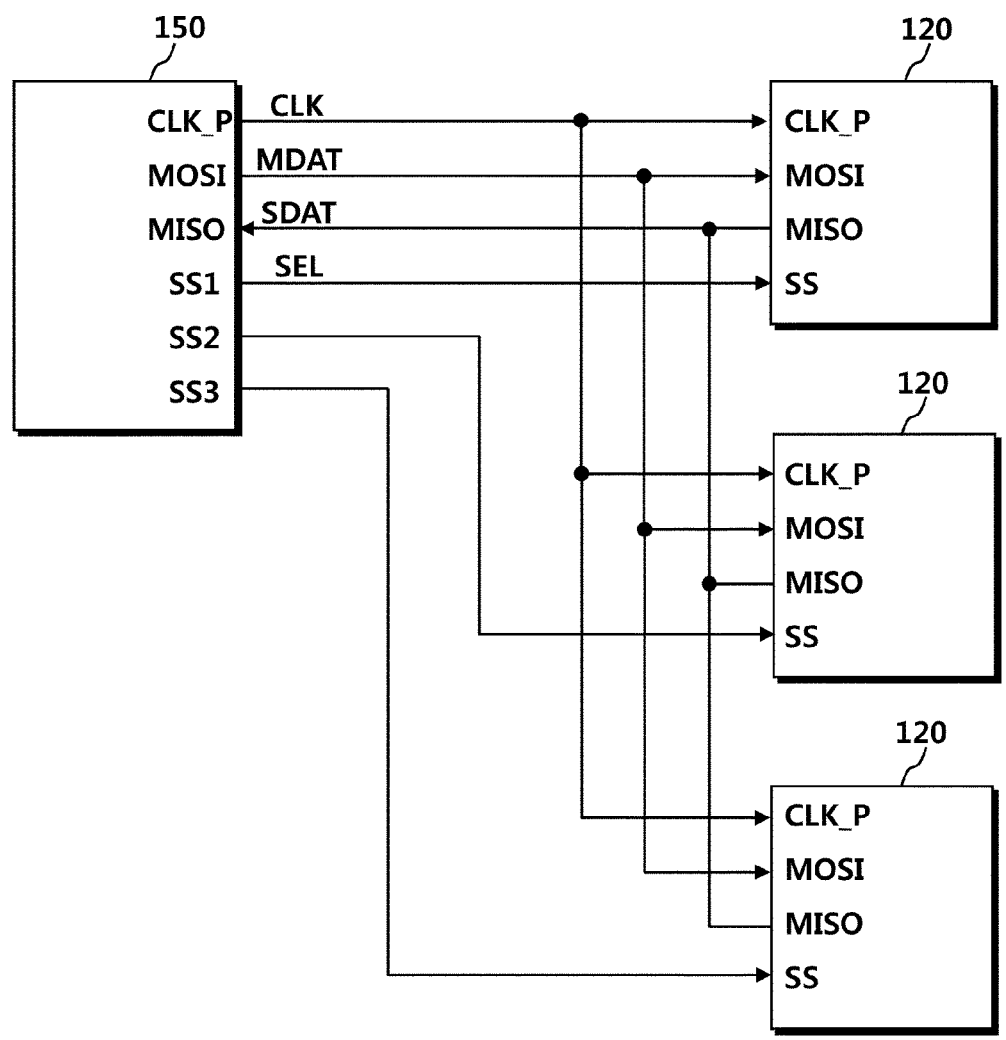
FIG. 5 is a diagram illustrating a second example of communication between a microcontroller and a source readout circuit according to an embodiment.

FIG. 5 is a diagram illustrating a second example of communication between a microcontroller 150 and a source readout circuit 120 according to an embodiment.

Referring to FIG. 5, the microcontroller 150 and the source readout circuit 120 may perform communication according to a SPI scheme. In the SPI communication, the microcontroller 150 may operate as a master and the plurality of source readout circuits 120 may operate as slaves.

The microcontroller 150 may transmit a clock (CLK) to the source readout circuit 120 via a CLK_P terminal. In addition, the microcontroller 150 may transmit master data (MDAT) to the source readout circuit 120 via a master out slave in (MOSI) terminal. The source readout circuit 120 may transmit slave data (SDAT) to the microcontroller 150 via a master in slave out (MISO) terminal. In addition, the microcontroller 150 may transmit a selection signal (SEL) to the source readout circuit 120 via SS1 to SS3 terminals, and may select one of the plurality of source readout circuits 120 for data transmission or reception.

Here, a communication line used for transmission of a clock (CLK), master data (MDAT), and slave data (SDAT) may be configured as a common bus.

Figure 6:
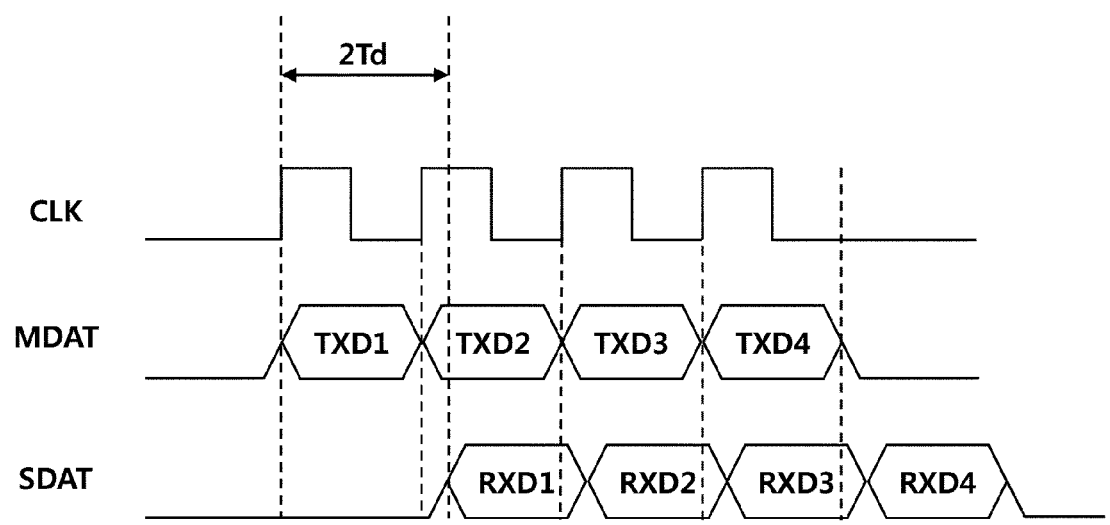
FIG. 6 is a diagram illustrating a waveform of a clock and data transmitted or received between a microcontroller and a source readout circuit according to an embodiment.

FIG. 6 is a diagram illustrating a waveform of a clock and data transmitted or received between a microcontroller 150 and a source readout circuit 120 according to an embodiment.

Referring to FIG. 6, a microcontroller 150, which is a master, and a source readout circuit which is a slave, may perform synchronization communication using a clock (CLK).

The microcontroller 150 may generate a clock (CLK) and master data (MDAT). The clock (CLK) may be generated from a signal that an internal oscillator (not illustrated) generates. The microcontroller 150 may transmit master data (MDAT) to a source readout circuit according to a clock (CLK). For example, the master data (MDAT) may be synchronized at a rising edge at which the clock (CLK) is changed from a low level to a high level. The source readout circuit 120 may read the value of the master data (MDAT) at the rising edge timing of the clock (CLK). In addition, the master data (MDAT) may be synchronized at a falling edge at which the clock (CLK) is changed from a high level to a low level. The source readout circuit may read the value of the master data (MDAT) at the falling edge timing of the clock (CLK).

The source readout circuit may receive a delayed clock (CLK) and delayed master data (MDAT). Here, the clock (CLK) and the master data (MDAT) may be transmitted from the master to a destination slave via the same path at the same timing and thus, the delay time of the clock (CLK) and the delay time of the master data (MDAT) may be the same. In the drawing, the delay time may be denoted as Td.

The source readout circuit may generate slave data (SDAT). Conventionally, the source readout circuit may transmit slave data (SDAT) to the microcontroller 150 according to a clock (CLK) which the microcontroller 150 used to transmit master data (MDAT). For example, the slave data (SDAT) may be synchronized at a rising edge or a falling edge of the clock (CLK) that the microcontroller 150 generates, and may be transmitted to the microcontroller 150.

In the same manner as the source readout circuit 120, the microcontroller 150 may also receive delayed slave data (SDAT). Here, the source readout circuit 120 may synchronize slave data (SDATA) with the clock (CLK) that the microcontroller 150 generates, and may transmit the slave data (SDAT) solely to the microcontroller 150 without a clock. The slave data (SDAT) may be delayed once more by the delay time Td of the master data (MDAT) based on the clock (CLK). That is, the delay of the slave data (SDAT) may be a period of time corresponding to a first time (Td) needed when the microcontroller 150 transmits master data (MDATA) to the source readout circuit 120 and a second time (Td) needed when the source readout circuit transmits slave data (SDAT) to the microcontroller 150. Therefore, the delay time of the slave data (SDAT) may be 2Td (Td+Td=2Td).

According to the comparison between the master data (MDAT) and the slave data (SDAT) based on the clock (CLK), the master data (MDAT) may be synchronized with the clock (CLK) and may have the same delay, and thus, the source readout circuit may not have a problem in reading the master data (MDAT). However, the slave data (SDAT) is delayed by 2Td when compared to the clock (CLK), and thus, the microcontroller 150 may have a problem in reading the slave data (SDAT). For example, the source readout circuit may perform sampling of all the first to fourth transmission bits (TXD1 to TXD4) at four rising edges of the clock (CLK). However, even though the microcontroller 150 needs to perform sampling of first to fourth reception bits (RXD1 to RXD4), the microcontroller 150 may perform sampling of only first to second reception bits (RXD1 and RXD2) or may perform sampling of only first to third reception bits (RXD1 to RXD3).

Therefore, if the microcontroller 150, which is the master, and the source readout circuit, which is the slave, synchronize the slave data (SDAT) with the clock (CLK), the microcontroller 150 may not correctly perform sampling of delayed slave data (SDAT) and may not appropriately read the slave data (SDAT).

Figure 7:
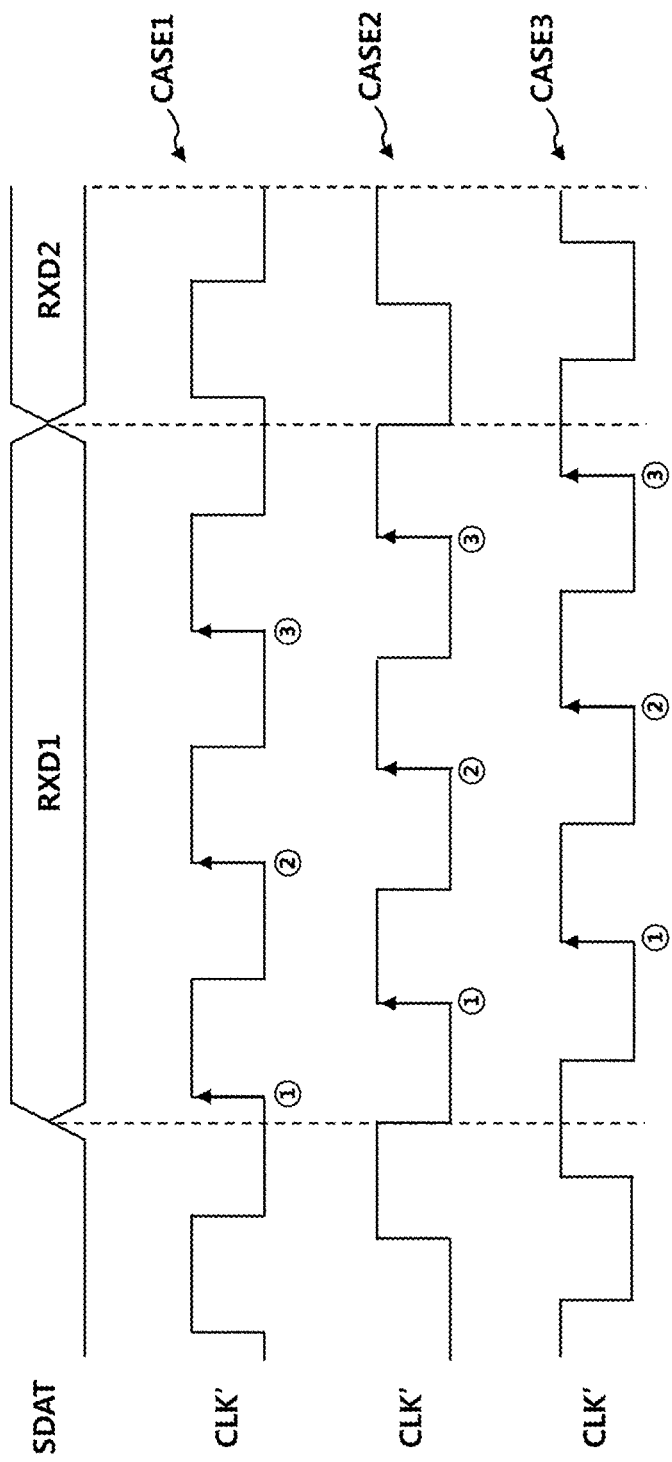
FIG. 7 is a diagram illustrating a process in which a microcontroller performs sampling of delayed slave data according to an embodiment.

FIG. 7 is a diagram illustrating a process in which a microcontroller 150 performs sampling of delayed slave data according to an embodiment.

Referring to FIG. 7, the microcontroller 150 may transmit first data and a first clock associated with the first data, and may receive second data generated according to a clock having a frequency identical to that of the first clock. A source readout circuit 120 may generate the second data and may transmit the same to the microcontroller 150. The microcontroller 150 may generate, from the first clock, a second clock to have a plurality of sampling points by increasing the frequency of the first clock. The microcontroller 150 may determine the plurality of sampling points in the second clock, and may perform sampling of the second data at one of the plurality of sampling points so as to recover the second data. The microcontroller 150 may perform sampling of the second data at the one sampling point timing in order to recover the second data, and may generate sampled data which is identical to the second data.

Here, the first data may correspond to master data (MDAT), and the second data may correspond to slave data (SDAT). The second data may include touch sensing data associated with an external object's touch or approach to the display device. The microcontroller 150 may perform sampling of the touch sensing data at one sampling point, and may read the data.

The recovery of the second data may be implemented by sampling the second data at one of the plurality of sampling points and generating one sampled data. The one sampled data may include a value that is identical to that of the second data, that is, the slave data (SDAT). Since a plurality of pieces of sampled data is identical to the slave data (SDAT), the microcontroller 150 may sequentially read the plurality of sampled data and may eventually read the slave data (SDAT).

Particularly, if delayed slave data (SDAT) is transmitted to the microcontroller 150, the slave data (SDAT) may be sampled by microcontroller 150.

The slave data (SDAT) may be delayed by a predetermined period of time, for example, 2Td, and may be transmitted to the microcontroller 150, which is a master.

The microcontroller 150 may perform sampling of the slave data (SDAT) and may read the data. In order to determine a sampling timing for the slave data (SDAT), the microcontroller 150 may use another clock.

The microcontroller 150 may generate another clock by increasing the frequency of a clock generated for transmitting master data, and may use the other clock as a sampling clock. The sampling clock may provide a sampling point for performing sampling of slave data (SDAT). The microcontroller 150 may generate the other clock by increasing the frequency of the clock. The other clock may have a plurality of sampling points, for example, a rising edge or a falling edge, and the microcontroller 150 may perform sampling of slave data (SDAT) at one of the plurality of sampling points. For example, the microcontroller 150 may generate the other clock to have at least N sampling points (N is a natural number greater than or equal to 2). Once one sampling point is determined for a piece of data of the slave data (SDAT), the microcontroller 150 may use the one sampling point for sampling of another piece of data of the slave data (SDAT).

Here, it does not matter whether the sampling point is a rising edge or a falling edge. A rising edge and a falling edge may be included together in the plurality of sampling points. Hereinafter, for ease of description, a description will be provided by taking a rising edge as an example.

For example, in the drawing, the microcontroller 150 may generate another clock having a high frequency based on a clock generated for transmission of master data. The microcontroller 150 may generate the other clock, for example, a sampling clock (CLK'), by increasing the frequency of the clock so that a plurality of sampling points are present within a first reception symbol (RXD1) of the slave data (SDAT). The sampling clock (CLK') may have three sampling points ①, ②, and ③ within the first reception symbol (RXD1).

Here, the microcontroller 150 may not use all sampling clocks (CLK'), but may use one of them for sampling. The sampling clock (CLK') is represented by CASE1 to CASE3 in order to show that one of a plurality of sampling points in a clock having a high frequency is surely used to validly perform sampling of the first reception symbol (RXD1).

The microcontroller 150 may determine one of the plurality of sampling points and may perform sampling of slave data (SDAT) based on the determined sampling point.

For example, the microcontroller 150 may maximally generate sampling clocks (CLK') as a clock having an increased frequency, as shown in CASE 1 to CASE 3. CASE 1 to CASE 3 may be understood as the number of cases of a sampling clock (CLK'). By taking into consideration a phase difference, the microcontroller 150 may generate three types of sampling clocks as shown in the drawing, which are represented as the sampling clocks (CLK') of CASE1 to CASE3. The microcontroller 150 may determine a second sampling point ②, which is different from a first sampling point ① and a third sampling point ③, as a sampling point. According to CASE1, synchronization is performed, such that a first sampling point ① is close to the start of the first reception symbol (RXD1) and thus, a first sampling clock (CLK' of CASE1) may be incapable of validly sampling the first reception symbol (RXD1) at the first sampling point ①. That is, the value of the first reception symbol (RXD1) and a sampled value may be different from each other. If the value of the first reception symbol (RXD1) is 0 or 1, the sampled value may be 1 or 0. According to CASE2, synchronization is performed, such that a third sampling point ③ is close to the end of the first reception symbol (RXD1) and thus, a third sampling clock (CLK' of CASE3) may be incapable of validly sampling the first reception symbol (RXD1) at the third sampling point ③. That is, the value of the first reception symbol (RXD1) and a sampled value may be different from each other. If the value of the first reception symbol (RXD1) is 0 or 1, the sampled value may be 1 or 0. However, according to CASE3, synchronization is performed, such that first to third sampling points ① to ③ are positioned within the first reception symbol (RXD1) with a wide margin, as opposed to being ambiguously positioned, and thus, the first reception symbol (RXD1) may be validly sampled at all sampling points. Therefore, sampling is valid at the second sampling point ②, irrespective of a sampling clock (CLK') of CASE 1 to CASE 3 that the microcontroller 150 uses, and thus, the microcontroller 150 may perform sampling of the first reception symbol (RXD1) at the second sampling ② point using one of CASE 1 to CASE 3.

The microcontroller 150 may regard sampled data obtained by sampling of the slave data (SDAT) as the slave data (SDAT). If the microcontroller 150 validly performs sampling of the slave data (SDAT), the sampled data may be identical to the slave data (SDAT). The microcontroller 150 may read the slave data by reading the sampled data. As described above, a process of generating and reading sampled data may be understood as recovery of slave data (SDAT).

Figure 8:
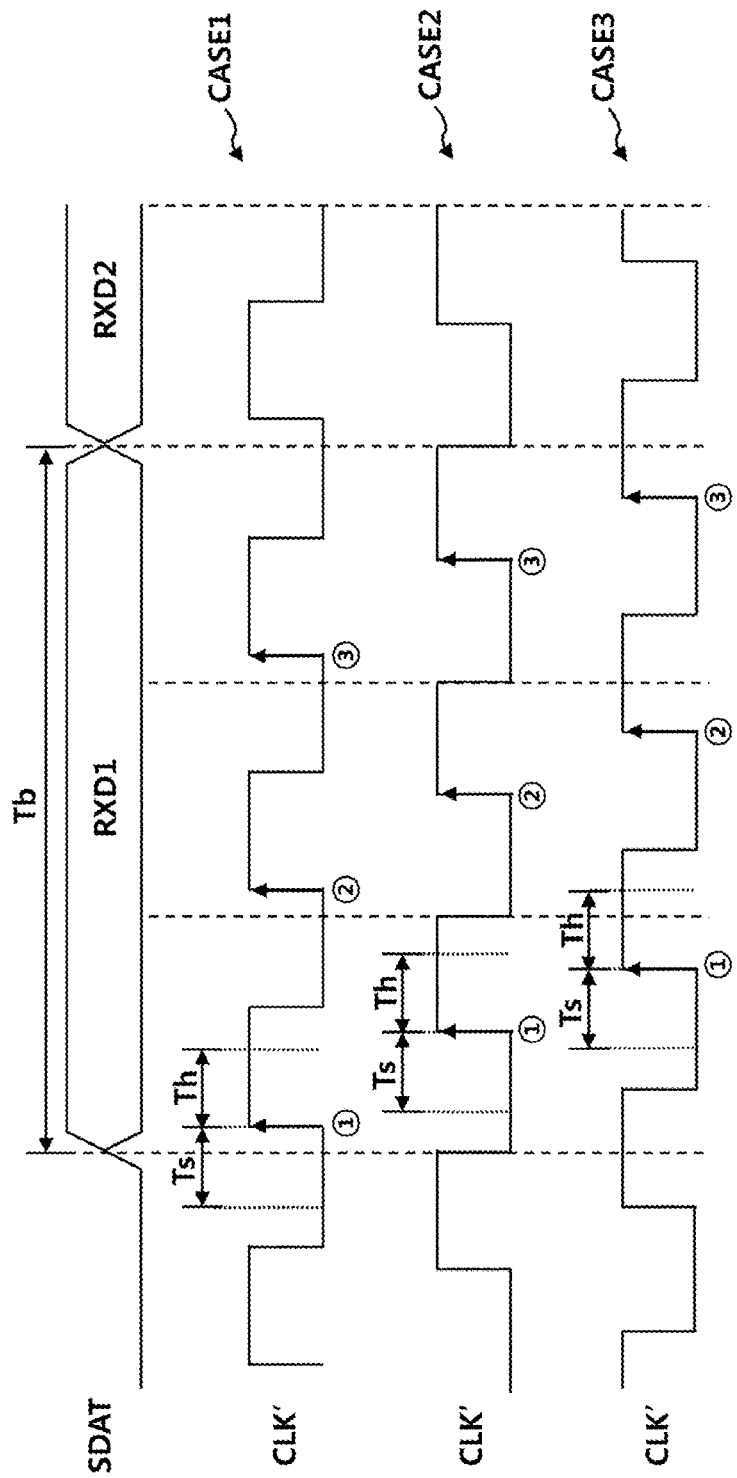
FIG. 8 is a diagram illustrating a valid sampling point according to an embodiment.

FIG. 8 is a diagram illustrating a valid sampling point according to an embodiment.

Referring to FIG. 8, a sampling clock (CLK') may be required to satisfy a predetermined condition in order to perform sampling of slave data (SDAT). The condition may be that predetermined sections of a sampling clock (CLK') need to overlap a data section of the slave data (SDAT). The data section may be an area including touch sensing data that a source readout circuit transmits, and may be understood as a bit section (Tb). At the same time, the condition may mean that a predetermined section of pulses of the sampling clock (CLK') needs to overlap all over the bit section (Tb) of the slave data. The predetermined section may be defined as a valid section used for a microcontroller 150 to recognize slave data (SDAT). Only when the valid section is within the bit section (Tb), the bit value of the bit section (Tb) may be correctly sampled. If the valid section is beyond the bit section (Tb), an error may occur while sampling of the bit value of the bit section (Tb) is performed.

The microcontroller 150 may generate a clock so that a sampling clock (CLK') has a valid section. The valid section may be a range of time, and may include a setup section (Ts) and a hold section (Th). To enable the microcontroller 150 to perform sampling at a sampling point, for example, at a rising edge, the setup section (Ts) and the hold section (Th) alongside each other need to fall within the bit section (Tb) based on the sampling point.

The setup section (Ts) and the hold section (Th) may be sections in which the level of the sampling clock (CLK') varies and the changed level is stabilized, and may be a valid section for obtaining correct sampled data. The setup section (Ts) may be the minimum time in which the slave data (SDAT) needs to be stabilized before a rising edge of the sampling clock (CLK'). The hold section (Th) may be the minimum time in which the slave data (SDAT) needs to be stabilized after the rising edge of the sampling clock (CLK'). In addition, the setup section (Ts) and the hold section (Th) may be the minimum times in which the slave data (SDAT) needs to be stabilized before and after a falling edge. The setup section (Ts) and the hold section (Th) may be a valid section needed for correct sampling at a rising edge or a falling edge.

If the valid section (the setup section (Ts) and the hold section (Th)) is beyond the data section of the slave data (SDAT), the microcontroller 150 may generate data which is different from data included in the data section, as a plurality of pieces of sampled data. If the valid section (the setup section (Ts) and the hold section (Th)) falls within the data section of the slave data (SDAT), the microcontroller 150 may generate data which is identical to the data included in the data section, as sampled data.

For example, according to a sampling clock (CLK') having a phase as shown in CASE 1, the microcontroller 150 may generate sampled data having an error at a first sampling point ①. It is because a setup section (Ts) is beyond the range of a bit section (Tb). At a second sampling point ② and a third sampling point ③, a valid section falls within the bit section (Tb), and thus, the microcontroller 150 may generate valid sampled data.

However, according to a sampling clock (CLK') having a phase as shown in CASE 2, the microcontroller 150 may generate valid sampled data at a first sampling point ①. It is because a setup section (Ts) and a hold section (Th) fall within the range of a bit section (Tb). At a second sampling point ② and a third sampling point ③, a valid section falls within the bit section (Tb), and thus, the microcontroller 150 may generate valid sampled data. According to a sampling clock (CLK') having a phase as shown in CASE 3, the microcontroller 150 may generate valid sampled data at a first sampling point ① and a second sampling point ②. It is because a setup section (Ts) and a hold section (Th) fall within the range of a bit section (Tb). However, if a valid section is beyond the range of the bit section (Tb) at a third sampling point ③, the microcontroller 150 may generate sampled data with an error.

As described above, the microcontroller 150 may not determine sampling points existing at the boundary of reception symbols (RXD1 and 2) as valid sampling points. That is, the microcontroller 150 may determine sampling points existing within, not at the boundary of, the section in which one reception symbol is continued (or a bit section), as valid sampling points. In the drawing, the microcontroller 150 may determine the second sampling point ②, as opposed to first and third sampling points ① and ③, as a valid sampling point.

Figure 9:
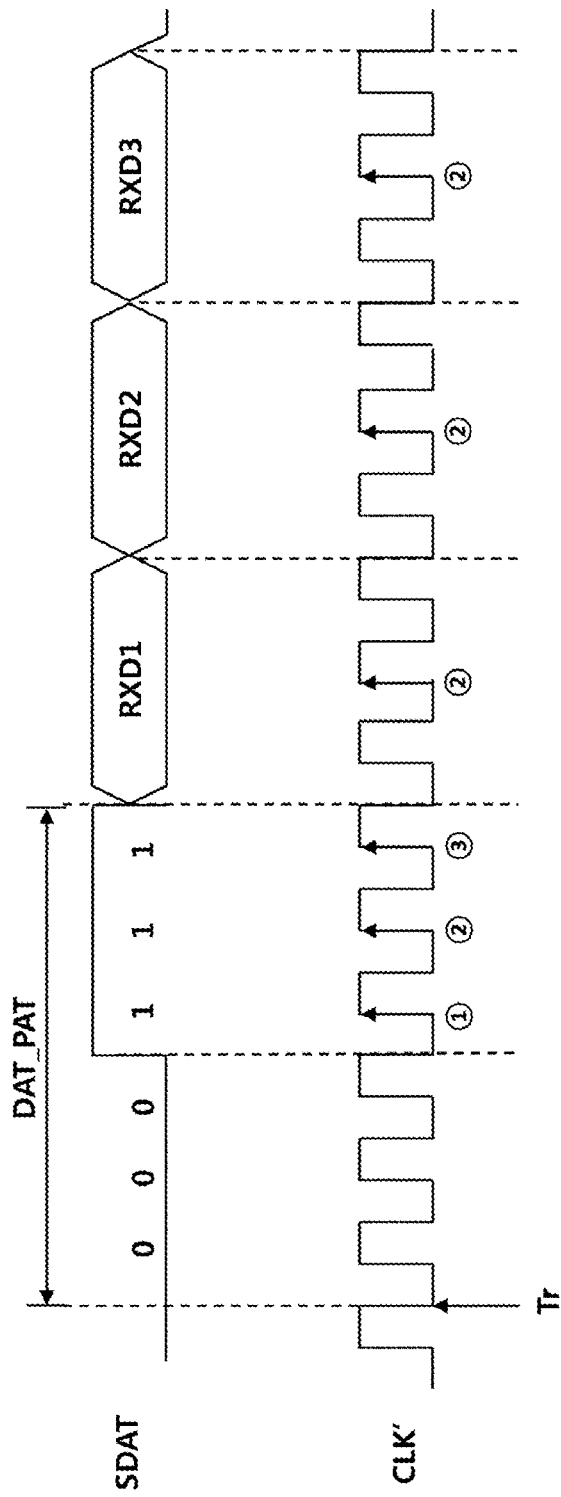
FIG. 9 is a diagram illustrating a process of determining a sampling point according to an embodiment.

FIG. 9 is a diagram illustrating a process of determining a sampling point according to an embodiment.

Referring to FIG. 9, a microcontroller 150 may recognize data by identifying pattern data indicating the state of data to be sampled, and may perform sampling of the data. The microcontroller 150 may recognize the pattern data, and may determine one of a plurality of sampling points. The microcontroller 150 may perform sampling of the data received after the pattern data, at the one sampling point. Here, the data may include touch sensing data associated with an external object's touch or approach to the display device.

For example, slave data (SDAT) may include pattern data (DAT_PAT) and reception bits (RXD1 to RXD3). The reception bits (RXD1 to RXD3) may include touch sensing data including information associated with an external object's touch or approach. The pattern data (DAT_PAT) may be located before the reception bits (RXD1 to 3) in the slave data (SDAT) or a most significant bit (MSB) area.

The microcontroller 150 may perform sampling of pattern data (DAT_PAT) at each sampling point according to a sampling clock (CLK'), and may read the value of the pattern data (DAT_PAT). If the microcontroller 150 reads predetermined values included in one pattern (DAT_PAT), the microcontroller 150 may recognize that reception bits (RXD1 to 3) come after the pattern data (DAT_PAT). The microcontroller 150 may determine one sampling point among a plurality of sampling points of the sampling clock (CLK'). In the drawing, the microcontroller 150 may use a second sampling point ② among first to third sampling points ①, ②, and ③ in order to perform sampling of the reception bits (RXD1 to RXD3).

At the first sampling point ① and the third sampling point ③, a setup section and a hold section may be beyond each section of the reception bits (RXD1 to RXD3), and thus, an error may occur. Therefore, only a second sampling point ② may be valid. At the second sampling point ②, the value of the sampled data and the value of the pattern data (DAT_PAT) may be identical, that is, 0 or 1. The microcontroller 150 may continuously perform sampling of all reception bits (RXD1 to 3) at the second sampling point ③.

The pattern data (DAT_PAT) may comprise a signal having a first level (low level or high level), comprise a signal having a second level (low level or high level) which is different from the first level, or comprise a signal having a combination of the first level and the second level. The value of the pattern data (DAT_PAT) may be expressed as a first signal level and a second signal level, and such logic signal levels may form a specific pattern. If the microcontroller 150 recognizes the specific pattern, the microcontroller 150 may recognize that data to be sampled will follow. In the drawing, the pattern data (DAT_PAT) may include a pattern including a value of "000111", and the pattern may be determined in advance between the microcontroller 150 and a source readout circuit 120.

The microcontroller 150 may determine a data pattern after a read command, to be the pattern data (DAT_PAT). The source readout circuit, which is a slave, may be configured in advance to transmit the pattern data (DAT_PAT) after the read command to the microcontroller 150, which is a master, and immediately thereafter, to transmit reception bits (RXD1 to 3), for example, touch sensing data. In the drawing, Tr may be the point in time at which the source readout circuit receives the read command.

Figure 10:
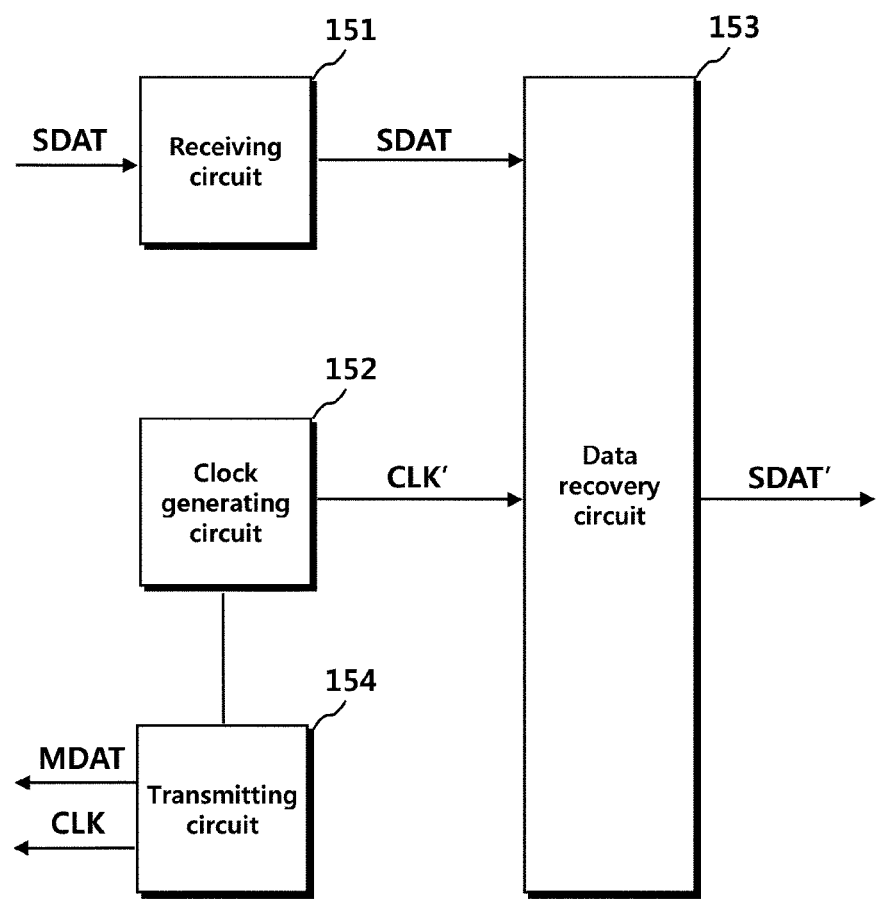
FIG. 10 is a diagram illustrating the configuration of a microcontroller according to an embodiment.

FIG. 10 is a diagram illustrating the configuration of a microcontroller 150 according to an embodiment.

Referring to FIG. 10, the microcontroller 150 may include a receiving circuit 151, a clock generating circuit 152, a data recovery circuit 153, and a transmitting circuit 154.

The transmitting circuit 154 may transmit master data (MDAT) and a clock (CLK) associated with the master data to a source readout circuit. The clock (CLK) may be generated by the clock generating circuit 152, and may be transmitted to the transmitting circuit 154.

The receiving circuit 151 may receive slave data (SDAT). The receiving circuit 151 may transmit the slave data (SDAT) to the data recovery circuit 153.

The clock generating circuit 152 may generate a sampling clock (CLK') having a plurality of sampling points by increasing the frequency of the clock (CLK).

For example, the clock generating circuit 152 may generate the sampling clock (CLK') to have a frequency which is N times (N is a natural number greater than or equal to 2) greater than that of the clock (CLK). In addition, the clock generating circuit 152 may generate the sampling clock (CLK') to have at least N sampling points (N is a natural number greater than or equal to 2). The clock generating circuit 152 may transfer the sampling clock (CLK'), generated from the clock (CLK), to the data recovery circuit 153.

The data recovery circuit 153 may determine one sampling point in the sampling clock (CLK'), may perform sampling of slave data (SDAT) at the timing of the one sampling point in order to recover the slave data (SDAT), and may generate sampled data which is identical to the slave data (SDAT).

The slave data (SDAT) may include touch sensing data which is to be sampled according to the sampling clock (CLK') and pattern data indicating the timing of the start of the touch sensing data. The data recovery circuit 153 may read the pattern data and may prepare sampling of the touch sensing data. The data recovery circuit 153 may determine one sampling point among a plurality of sampling points of the sampling clock (CLK'). The data recovery circuit 153 may perform sampling of the touch sensing data at the one sampling point.

A pattern value included in the pattern data may be determined in advance between the microcontroller 150 and the source readout circuit 120.

The data recovery circuit 153 may generate a plurality of pieces of sampled data by sampling the slave data (SDAT) at each reception bit (symbol), and may recover the slave data (SDAT). The recovered slave data (SDAT') may be not the slave data itself which the receiving circuit 151 receives from the source read out circuit, but may be understood as another data that the data recovery circuit 153 recovers from the plurality of sampled data. The recovered slave data (SDAT') and the slave data (SDAT) may have an identical value.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A microcontroller included in a display device, the microcontroller comprising:
    a transmitting circuit configured to transmit first data and a first clock synchronized with the first data;
    a receiving circuit configured to receive second data generated according to a clock having a frequency identical to that of the first clock;
    a clock generating circuit configured to generate a second clock having a frequency higher than that of the first clock; and
    a data recovery circuit configured to determine a plurality of sampling points in the second clock, to perform sampling of the second data at one of the plurality of sampling points, and to recover the second data.

2. The microcontroller of claim 1, wherein the second data comprises data sampled according to the second clock and pattern data which indicates a start of the data, and
    wherein the data recovery circuit recognizes the data by identifying the pattern data and performs sampling of the data.

3. The microcontroller of claim 2, wherein the pattern data is received via the receiving circuit after a read command for the second data is provided.

4. The microcontroller of claim 2, wherein the pattern data comprises a signal having a combination of a first level and a second level which is different from the first level.

5. The microcontroller of claim 1, wherein the clock generating circuit generates the second clock to have a frequency which is N times (N is a natural number greater than or equal to 3) greater than that of the first clock.

6. The microcontroller of claim 1, wherein the transmitting circuit transmits the first clock in a section during which the first data is transmitted and a section during which the second data is received.

7. The microcontroller of claim 1, wherein the plurality of sampling points respectively correspond to rising edges or falling edges of the second clock.

8. The microcontroller of claim 1, wherein the second data comprises touch sensing data associated with an external object's touch or approach to the display device.

9. The microcontroller of claim 8, wherein the second data is received from a readout circuit included in the display device.

10. The microcontroller of claim 1, wherein the second clock has a setup section and a hold section before and after each of the plurality of sampling points, and
    wherein the data recovery circuit generates valid sampled data if the setup section and the hold section fall within a section corresponding to one symbol of the second data.

11. A display device comprising:
    a microcontroller configured to transmit first data and a first clock synchronized with the first data; and
    a readout circuit configured to generate second data according to a clock having a frequency which is identical to that of the first clock, and to transmit the second data to the microcontroller,
    wherein the microcontroller generates a second clock having a frequency higher than that of the first clock, determines a plurality of sampling points in the second clock, performs sampling of the second data at one of the plurality of sampling points, and recovers the second data.

12. The display device of claim 11, wherein the microcontroller generates the second clock to have at least N sampling points (N is a natural number greater than or equal to 3).

13. The display device of claim 11, wherein a time-delay occurs in signal lines between the microcontroller and the readout circuit.

14. The display device of claim 11, wherein the readout circuit generates the second data such that the second data is synchronized with the first clock.

15. The display device of claim 11, wherein the second data comprises touch sensing data associated with an external object's touch or approach to the display device, and the microcontroller performs sampling of the touch sensing data at the one sampling point.

* * * * *